United States Patent
Lammel et al.

(10) Patent No.: US 9,200,923 B2
(45) Date of Patent: Dec. 1, 2015

(54) PEDOMETER HAVING AUTOMATIC STEP LENGTH ADJUSTMENT, METHOD FOR OPERATING A PEDOMETER AND APPLICATION OF SAID PEDOMETER

(75) Inventors: Gerhard Lammel, Tuebingen (DE); Daniel Schifferdecker, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 955 days.

(21) Appl. No.: 13/388,005

(22) PCT Filed: Jun. 2, 2010

(86) PCT No.: PCT/EP2010/057690
§ 371 (c)(1), (2), (4) Date: Apr. 12, 2012

(87) PCT Pub. No.: WO2011/012358
PCT Pub. Date: Feb. 3, 2011

(65) Prior Publication Data
US 2012/0191410 A1 Jul. 26, 2012

(30) Foreign Application Priority Data
Jul. 29, 2009 (DE) .......... 10 2009 028 069

(51) Int. Cl.
*G01B 7/02* (2006.01)
*G01C 22/00* (2006.01)
*G06K 9/00* (2006.01)

(52) U.S. Cl.
CPC .......... *G01C 22/006* (2013.01); *G06K 9/00348* (2013.01)

(58) Field of Classification Search
CPC ................. G01C 22/00; G06F 15/00
USPC .......................................... 702/160
See application file for complete search history.

(56) References Cited

U.S. PATENT DOCUMENTS

| | | | |
|---|---|---|---|
| 5,724,265 A * | 3/1998 | Hutchings | 702/141 |
| 5,899,963 A * | 5/1999 | Hutchings | 702/145 |
| 6,122,960 A * | 9/2000 | Hutchings et al. | 73/493 |
| 6,145,389 A * | 11/2000 | Ebeling et al. | 73/865.4 |
| 6,175,608 B1 * | 1/2001 | Pyles et al. | 377/24.2 |
| 6,434,212 B2 * | 8/2002 | Pyles | 377/24.2 |
| 6,585,622 B1 * | 7/2003 | Shum et al. | 482/8 |
| 6,594,617 B2 * | 7/2003 | Scherzinger | 702/160 |
| 6,837,827 B1 * | 1/2005 | Lee et al. | 482/8 |
| 6,882,955 B1 * | 4/2005 | Ohlenbusch et al. | 702/160 |

(Continued)

FOREIGN PATENT DOCUMENTS

| | | |
|---|---|---|
| CN | 1329713 | 1/2002 |
| DE | 102007043490 | 3/2009 |
| EP | 1770370 | 4/2007 |

OTHER PUBLICATIONS

International Search Report, PCT International Application No. PCT/EP2010/057690, dated Aug. 4, 2010.

*Primary Examiner* — Sujoy Kundu
*Assistant Examiner* — Alvaro Fortich
(74) *Attorney, Agent, or Firm* — Kenyon & Kenyon LLP

(57) ABSTRACT

A pedometer for determining the length of a route traveled on foot includes an acceleration sensor for ascertaining a number of steps as well as a pressure sensor for ascertaining a change in geographic elevation, and an evaluation unit being configured to adapt the step length to the measured average elevation change per step.

16 Claims, 4 Drawing Sheets

(56) References Cited

U.S. PATENT DOCUMENTS

| | | | |
|---|---|---|---|
| 7,092,846 B2 * | 8/2006 | Vock et al. | 702/182 |
| 7,433,805 B2 * | 10/2008 | Vock et al. | 702/188 |
| 7,552,031 B2 * | 6/2009 | Vock et al. | 702/188 |
| 7,930,135 B2 * | 4/2011 | Ma et al. | 702/160 |
| 8,289,154 B2 * | 10/2012 | Kodrin et al. | 340/539.13 |
| 8,718,935 B2 * | 5/2014 | Miller et al. | 701/469 |
| 8,744,804 B2 * | 6/2014 | Messenger et al. | 702/160 |
| 2001/0022828 A1 * | 9/2001 | Pyles | 377/24.2 |
| 2002/0038178 A1 * | 3/2002 | Talkenberg et al. | 701/200 |
| 2002/0107649 A1 * | 8/2002 | Takiguchi et al. | 702/75 |
| 2003/0018430 A1 * | 1/2003 | Ladetto et al. | 701/217 |
| 2004/0064286 A1 * | 4/2004 | Levi et al. | 702/141 |
| 2007/0132637 A1 * | 6/2007 | Kolavennu et al. | 342/450 |
| 2008/0172203 A1 * | 7/2008 | Jorgensen | 702/160 |
| 2008/0254944 A1 * | 10/2008 | Muri et al. | 482/8 |
| 2009/0018794 A1 * | 1/2009 | Meriheina | 702/141 |
| 2009/0043531 A1 * | 2/2009 | Kahn et al. | 702/149 |
| 2010/0280792 A1 * | 11/2010 | Paiva Velhote Correia et al. | 702/160 |

* cited by examiner

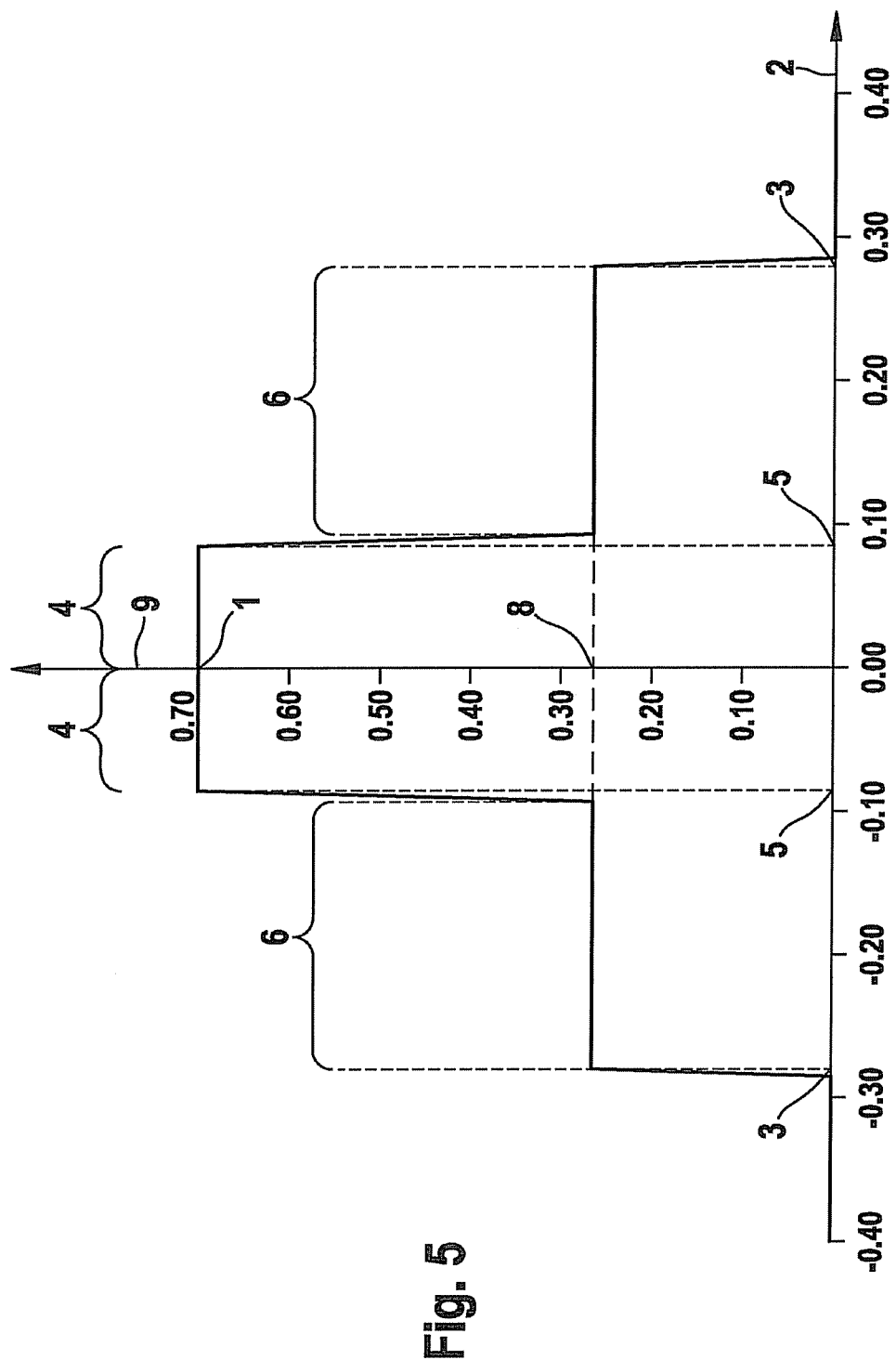

PEDOMETER HAVING AUTOMATIC STEP LENGTH ADJUSTMENT, METHOD FOR OPERATING A PEDOMETER AND APPLICATION OF SAID PEDOMETER

FIELD OF THE INVENTION

The present invention relates to a pedometer.

BACKGROUND INFORMATION

Pedometers of this kind, hereinafter also called "step counters," are commonly known. The document DE 10 2007 043 490, for example, discloses a pedometer in which a number of steps, and by way of a predefined step length a route traveled, can be deduced by evaluating the signals of an acceleration sensor. Because the distance thereby ascertained corresponds only to a "bee-line," projected onto the plane, between the starting point and destination, provision is further made to use a pressure sensor to take into account the elevation profile over the route segment. A disadvantage of the conventional pedometer is that provision is made only for general consideration of how the elevation that has been negotiated influences the length of the route traveled. The existing art does not disclose variable adaptation to a change in elevation of the step length taken into account in route measurement, and this form of route calculation is therefore relatively inaccurate.

SUMMARY

The pedometer according to example embodiments of the present invention, and the method according to example embodiments of the present invention for counting steps, have the advantage, as compared with the existing art, that an adaptation of the predefined step length to the measured average elevation change is performed for each step, i.e. in variable fashion, if the measured average elevation change per step, in particular with reference to a specific sub-route, changes significantly. This enables a more accurate determination of routes traveled on foot on the basis of pedometers.

In general, a person varies the length of his or her steps when walking. The step length depends in particular on the elevation being negotiated with each step while walking. For example, a person usually automatically shortens the length of his or her steps when walking outdoors uphill or downhill. The step length becomes considerably shorter especially when climbing or descending stairs. This results in an erroneous calculation of routes traveled on foot if the calculation is based on the number of steps and assumes an unadapted step length. It is advantageous that a relatively flexible adaptation of the step length is possible as a function of the profile of the route traveled. For example, even in the case of a sequence of positive and negative elevation changes that add up to a total elevation change of zero, an adaptation of step lengths to the respective positive or negative slope can be performed.

Especially when ascertaining the length of routes traveled in buildings, in which stairs need to be repeatedly climbed and described, a higher accuracy as compared with conventional systems can thereby be achieved. If the calculated routes traveled are to be used, for example, for dead reckoning, it is advantageous, in particular inside buildings, tunnels, and subway stations, to be able to make an accurate determination of routes traveled on the basis of step length, since a position correction based on GPS signals, which is usually performed in the context of dead reckoning, is not possible in locations with poor or insufficient GPS reception. Dead reckoning of this kind may be necessary, for example, for location-based services.

According to example embodiments, provision is made that for a measured average elevation change per step of zero, the variable step length has a value corresponding to the predefined step length, which value is referred to hereinafter as a "maximum value"; and that the variable step length becomes increasingly shorter as the absolute value of the measured average elevation change per step becomes greater. This means that on a level route (i.e. no measured average elevation change, or the measured average elevation change per step is equal to zero), the variable step length is allocated to a maximum value. The allocated value of the variable step length decreases as the absolute value of the measured average elevation change per step increases. A particularly accurate route calculation thereby becomes possible.

According to example embodiments, provision is made that the predefined step length is in a range from 50 cm to 100 cm, particularly preferably in a range from 60 cm to 80 cm, and very particularly preferably is 70 cm.

According to example embodiments, provision is made that the variable step length is zero when the absolute value of the measured average elevation change per step is greater than a predefined upper elevation change per step, the predefined upper elevation change per step being in a range from 25 cm to 35 cm, particularly preferably in a range from 27 cm to 30 cm, and very particularly preferably being 28 cm. This likewise makes it possible to improve the calculation of routes. Because the average height of a stair riser in buildings is approximately 14 cm, a step in which, for example, two stair risers are climbed or descended at once can still be classified as walking on a upward or downward slope. For greater elevation changes per step, on the other hand, a special instance must be assumed, for example climbing or descending a ladder.

According to example embodiments, provision is made that the evaluation unit is configured for averaging of the pressure signals over a time interval, the length of the time interval being equal to 1 to 10 seconds, preferably 2 to 6 seconds, and particularly preferably 3 to 4 seconds. This averaging is effected in order to reduce errors when measuring the average elevation change per step, which errors can occur as a result of movements of a user of the pedometer or because of interference with the pressure sensor signal.

According to example embodiments, provision is made that in a first region of the measured average elevation per step starting from zero up to a predefined threshold value, the variable step length is the predefined step length, i.e. corresponds to the maximum value; and that in a second region starting from a first threshold step length, the variable step length decreases as the absolute value of the measured average elevation change per step increases, the threshold value being in a range from 4 cm to 12 cm per step, preferably in a range from 6 cm to 10 cm per step, and particularly preferably being 8 cm per step, and the first threshold step length being preferably in a range from 35 cm to 60 cm and particularly preferably in a range from 40 cm to 58 cm. This threshold value is provided in addition to the time averaging of the pressure signal in order to compensate for interference with the signal of the pressure sensor.

A further aspect hereof is a method for determining the length of a route traveled on foot, a number of steps being ascertained on the basis of the acceleration signals of an acceleration sensor, and a change in geographic elevation being ascertained on the basis of the pressure signals of a pressure sensor. An adaptation of the step length to the measured average elevation change per step enables a more accurate determination of the length of the route traveled than in conventional arrangements.

A further aspect hereof is use of the above-described pedometer for dead reckoning in buildings and for the provision of location-based services.

Exemplifying embodiments of the present invention are depicted in the drawings and explained further in the description that follows.

DETAILED DESCRIPTION

Figure 1:
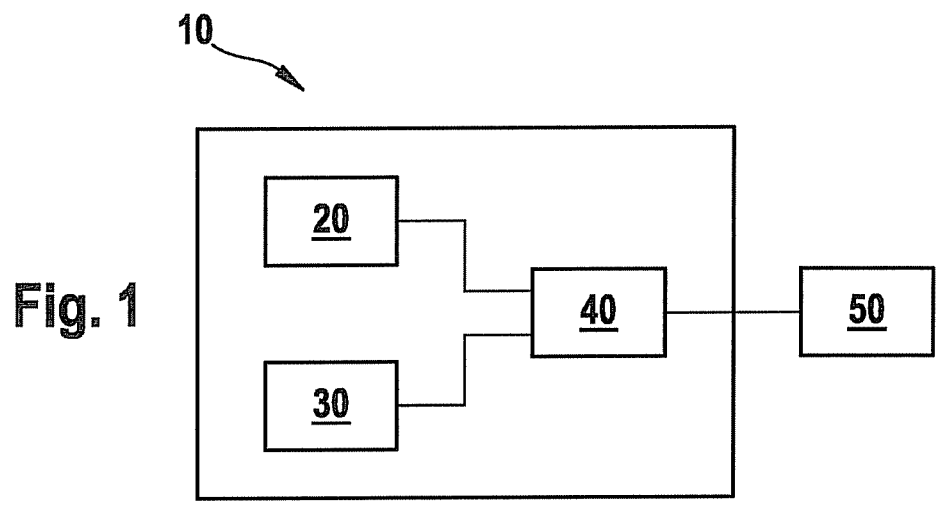
FIG. 1 schematically depicts the pedometer according to an exemplifying embodiment of the present invention, FIG. 2 schematically depicts an example of an elevation profile along a route segment, FIG. 3 schematically depicts the change in variable step length as a function of the elevation change per step, according to a first embodiment of the present invention, FIG. 4 schematically depicts the change in variable step length as a function of the elevation change per step, according to a second embodiment of the present invention, and FIG. 5 schematically depicts the change in variable step length as a function of the elevation change per step, according to a third embodiment of the present invention.

FIG. 1 is a schematic block diagram of a pedometer 10 according to an exemplifying embodiment of the present invention, pedometer 10 having an acceleration sensor 20, a pressure sensor 30, an evaluation unit 40, and an output unit 50.

The signals of acceleration sensor 20 and of pressure sensor 30 are delivered to evaluation unit 40, which in turn delivers the results of an evaluation of those signals to output unit 50.

Figure 2:
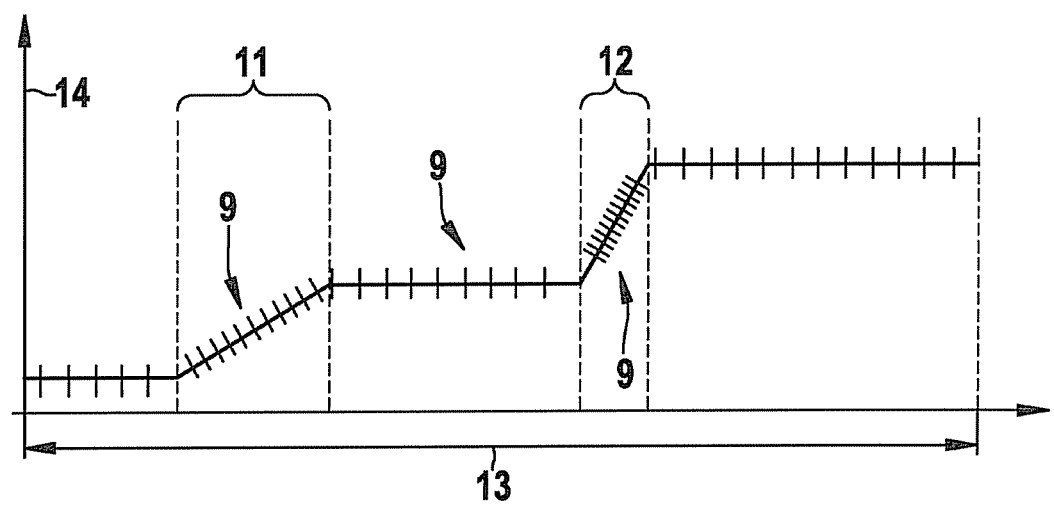

FIG. 2 is a schematic diagram of an example of an elevation profile along a route segment of a route traveled 13. Route 13 has a first sub-route 11 and a second sub-route 12 that exhibit different slopes. The geographic elevation 14 is additionally indicated. In addition, a variable step length 9, which is used as the basis for calculating the length of route traveled 13, is depicted schematically in various regions of route 13. It is evident that variable step length 9 differs in different regions of route 13. On first sub-route 11 having a first slope, a comparatively shorter variable step length 9 is assumed. On second sub-route 12 having a greater slope, an even shorter variable step length 9 is assumed. A greater slope (positive or negative) corresponds to a greater measured average elevation change per step 2.

Figure 3:
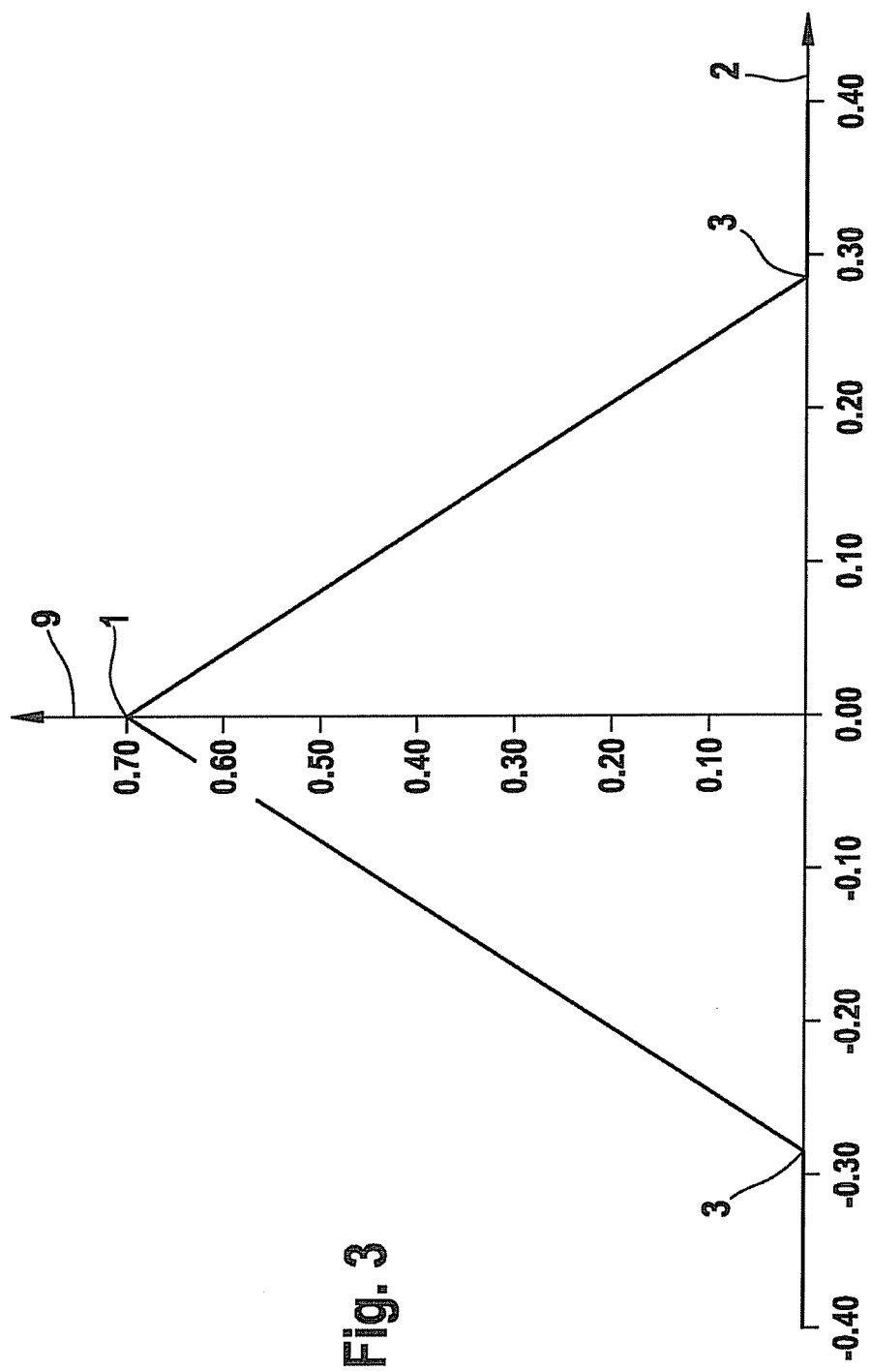

In FIG. 3, the values assumed by variable step length 9 in accordance with a first embodiment of the present invention are plotted against the measured average elevation change per step 2. For a measured average elevation change per step 2 of zero, variable step length 9 is assigned a value of 70 cm, which corresponds to an assumed value for a person's step length on level ground. This value is decreased, according to the present invention, for measured upward or downward slopes, and this value is therefore referred to hereinafter as a "maximum value." For a measured average elevation change per step 2 having a greater absolute value, variable step length 9 continuously decreases until, starting from an upper elevation change per step 3, a variable step length 9 of zero is set. Beyond this upper elevation change per step 3, it is assumed that special instances exist; these can be, for example climbing or descending a ladder, or changes in environmental influences. Instead of the linear profiles depicted, however, other (for example, step-shaped) profiles are also conceivable, such as those that can result from digitization of the pressure and acceleration signals.

Figure 4:
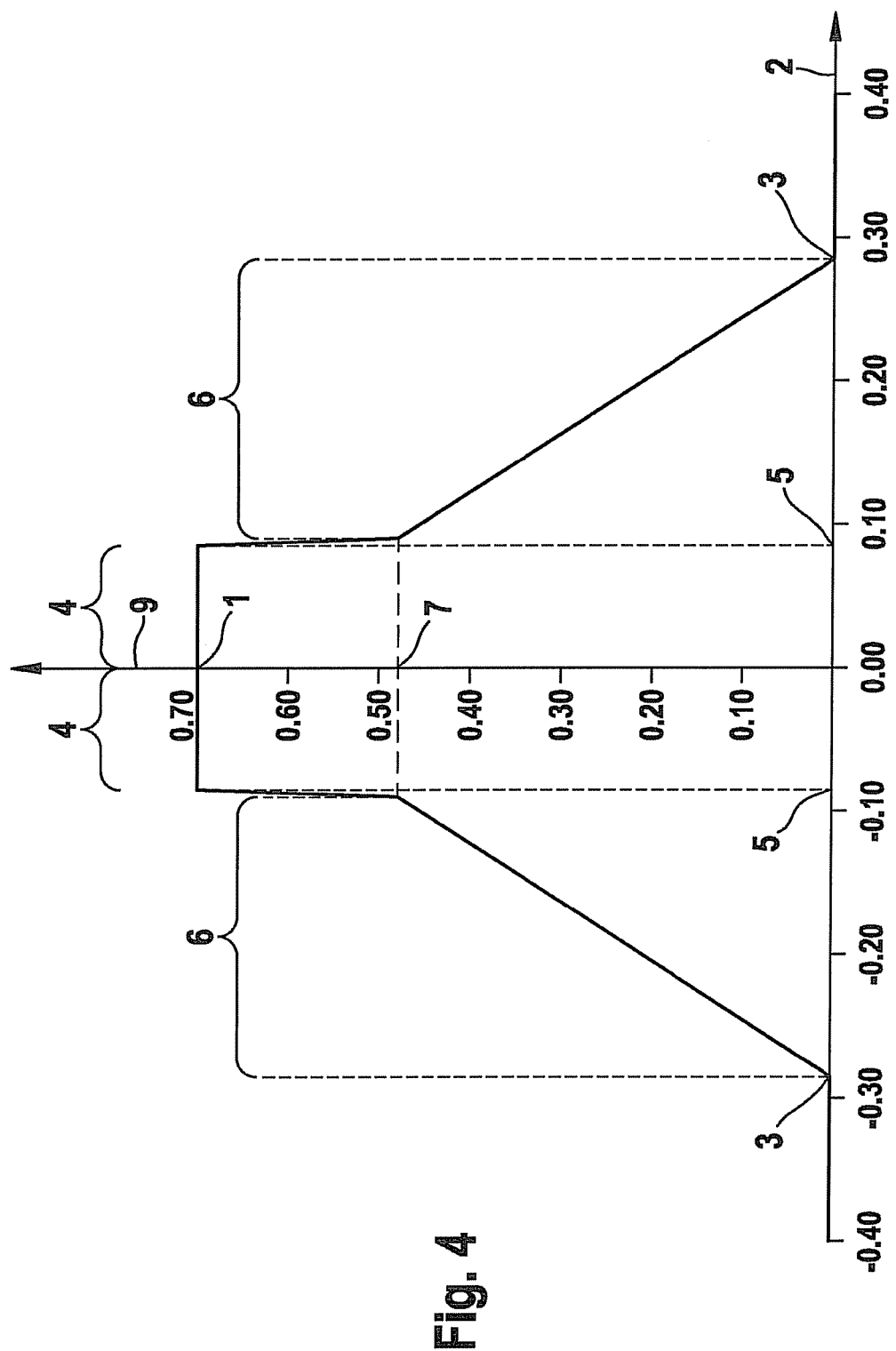

In FIG. 4, the values assumed by variable step length 9 in accordance with a second embodiment of the invention are plotted against a measured average elevation change per step 2. For a measured average elevation change per step 2 of zero, variable step length 9 is assigned a value of 70 cm, which corresponds to an assumed value for a person's step length on level ground. Starting from a threshold value 5 of the measured average elevation change per step 2, a change in slope is assumed. Variable step length 9 correspondingly decreases to a first threshold step length 7 that corresponds to the measured average elevation change per step 2. In a second region 6, variable step length 9 decreases, as described in FIG. 3, to the upper elevation change per step 3, beyond which a variable step length 9 of zero is set.

In FIG. 5, the values assumed by variable step length 9 in accordance with a third embodiment of the present invention are plotted against a measured average elevation change per step 2. For a measured average elevation change per step 2 of zero, in a first region 4 the variable step length 9 is assigned a value of 70 cm, which corresponds to an assumed value for a person's step length on level ground. Starting from a threshold value 5 of the measured average elevation change per step 2, variable step length 9 decreases to a second threshold step length 8. This second threshold step length 8 has a constant value, corresponding to a constant step length when climbing or descending stairs, over an entire second region 6. Region 6 ends at an upper elevation change per step 3, at which variable step length 9 decreases again to zero.

What is claimed is:

1. A pedometer, comprising:
   an acceleration sensor adapted to detect a number of steps on the basis of acceleration signals of the acceleration sensor;
   a pressure sensor adapted to detect an elevation change on the basis of pressure signals of the pressure sensor; and
   an evaluation unit adapted to determine, by a predefined step length, a length of a route traveled;
   wherein the evaluation unit is adapted to use a variable step length as a function of a measured average elevation change per step, in order to determine the length of the route traveled; and
   wherein for a measured average elevation change per step of zero, the variable step length has a maximum value corresponding to the predefined step length, and the variable step length becomes increasingly shorter as an absolute value of the measured average elevation change per step becomes greater.

2. The pedometer according to claim 1, wherein the predefined step length is in a range from 50 cm to 100 cm.

3. The pedometer according to claim 1, wherein the variable step length is zero when an absolute value of the measured average elevation change per step is greater than a predefined upper elevation change per step, the predefined upper elevation change per step being in a range from 25 cm to 35 cm.

4. The pedometer according to claim 1, wherein the evaluation unit is configured to average the pressure signals over a time interval, a length of the time interval being in a range from 1 to 10 seconds.

5. The pedometer according to claim 1, wherein in a first region of the measured average elevation per step starting at zero and ending at a predefined threshold value, the variable step length is the predefined step length, and in a second region starting at a first threshold step length, the variable step length decreases as an absolute value of the measured average elevation change per step increases, the threshold value being in a range from 4 cm to 12 cm per step, and the first threshold step length being in a range from 35 cm to 60 cm.

6. The pedometer according to claim 1, wherein in a first region starting at zero and ending at a predefined threshold value of the measured average elevation change per step, the variable step length is the predefined step length, and in a second region the variable step length is a constant second threshold step length, the second threshold step length being in a range from 20 cm to 35 cm.

7. A method for operating a pedometer, comprising:
   detecting a number of steps on the basis of acceleration signals of an acceleration sensor;
   detecting a change in elevation on the basis of pressure signals of a pressure sensor; and
   determining a length of a route traveled on the basis of a predefined step length;
   wherein a variable step length as a function of a measured average elevation change per step is used to determine the length of the route traveled; and
   wherein for a measured average elevation change per step of zero, the variable step length has a maximum value corresponding to the predefined step length, and the variable step length becomes increasingly shorter as an absolute value of the measured average elevation change per step becomes greater.

8. A method, comprising:
   using a pedometer according to claim 1 for dead reckoning in buildings or for location-based services.

9. The pedometer according to claim 2, wherein the predefined step length is in a range from 60 cm to 80 cm.

10. The pedometer according to claim 3, wherein the predefined upper elevation change per step is in a range from 27 cm to 30 cm.

11. The pedometer according to claim 4, wherein the length of the time interval is in a range from 2 to 6 seconds.

12. The pedometer according to claim 4, wherein the length of the time interval is in a range from 3 to 4 seconds.

13. The pedometer according to claim 5, wherein the threshold value is in a range from 6 cm to 10 cm per step.

14. The pedometer according to claim 5, wherein the threshold value is 8 cm per step.

15. The pedometer according to claim 5, wherein the first threshold step length is in a range from 40 cm to 58 cm.

16. The pedometer according to claim 6, wherein the second threshold step length is in a range from 25 cm to 30 cm.

* * * * *